(12) United States Patent
Stewart et al.

(10) Patent No.: US 10,547,206 B2
(45) Date of Patent: Jan. 28, 2020

(54) FAULT-TOLERANT POWER NETWORK

(71) Applicant: Linear Technology Corporation, Milpitas, CA (US)

(72) Inventors: Heath Stewart, Santa Barbara, CA (US); Andrew J. Gardner, Santa Barbara, CA (US); David Stover, Santa Barbara, CA (US); David Dwelley, Santa Barbara, CA (US); Jeffrey L. Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 240 days.

(21) Appl. No.: 15/723,631

(22) Filed: Oct. 3, 2017

(65) Prior Publication Data

US 2018/0115191 A1 Apr. 26, 2018

Related U.S. Application Data

(60) Provisional application No. 62/411,431, filed on Oct. 21, 2016.

(51) Int. Cl.
*H02J 13/00* (2006.01)
*H04L 12/10* (2006.01)
(Continued)

(52) U.S. Cl.
CPC .......... *H02J 13/0003* (2013.01); *G05B 15/02* (2013.01); *H04L 12/10* (2013.01); *Y02E 60/74* (2013.01); *Y04S 10/30* (2013.01)

(58) Field of Classification Search
CPC .......... H02J 13/00; H04L 12/10; H04L 12/24; H04L 12/26; H04L 12/437; G05B 15/02; G01R 27/16
See application file for complete search history.

(56) References Cited

U.S. PATENT DOCUMENTS

2009/0031152 A1 1/2009 Bolderl-Ermel et al.
2010/0231054 A1 9/2010 Togawa
(Continued)

FOREIGN PATENT DOCUMENTS

EP 3236615 A1 10/2017
JP 2008539631 A 11/2008
(Continued)

OTHER PUBLICATIONS

EPO, "Extended EP Search Report" dated Feb. 7, 2018, 8 pages.

*Primary Examiner* — Neel D Shah
(74) *Attorney, Agent, or Firm* — Patent Law Group LLP; Brian D. Ogonowsky

(57) ABSTRACT

One or more Power Sourcing Equipment (PSE) are coupled to points in a network of interconnected nodes. Each node has a first port and a second port. Assume the first port of a first node is receiving DC power from the PSE. The first node, at its second port, then detects an electrical signature from a first port of an adjacent second node. If the proper electrical signature is presented by the adjacent second node, the powered first node closes a switch to pass power between its first port and second port to power the second node via the first port of the second node. All nodes in the network are then sequentially powered up in this manner. If there is a fault between the first node and the second node, the second node will be powered by another node connected to the second port of the second node.

19 Claims, 3 Drawing Sheets

(51) Int. Cl.
*H04L 12/24* (2006.01)
*H04L 12/26* (2006.01)
*H04L 12/437* (2006.01)
*G05B 15/02* (2006.01)
*G01R 27/16* (2006.01)

(56) References Cited

U.S. PATENT DOCUMENTS

2014/0183557 A1   7/2014  Kang et al.
2016/0191256 A1   6/2016  Wendt et al.
2017/0310491 A1*  10/2017 Dwelley ............... H04L 12/403

FOREIGN PATENT DOCUMENTS

| | | |
|---|---|---|
| JP | 2010213068 A | 9/2010 |
| JP | 2014183557 A | 9/2014 |
| WO | 2006114687 A2 | 11/2006 |

\* cited by examiner

FAULT-TOLERANT POWER NETWORK

CROSS-REFERENCE TO RELATED APPLICATIONS

This application claims priority to U.S. provisional application Ser. No. 62/411,431, filed Oct. 21, 2016, by Heath Stewart et al., incorporated herein by reference.

FIELD OF THE INVENTION

This invention relates to a power network where Power Sourcing Equipment (PSE) supplies power to one or more loads at node locations and, in particular, to a power network where power is automatically routed around any faults between the nodes.

BACKGROUND

In conventional power systems used in automobiles and industrial applications, DC power is typically supplied to different loads via point-to-point wiring or via a power bus where the various loads tap off the same power bus. With such systems, a fault between the power supply and any of the loads causes there to be loss of power downstream of the fault. Further, if the fault is a short circuit, the power supply will be shut down due to an over-current, and power to all loads will be disrupted.

What is needed is a "smart" power network where power is routed around faults and the faults are isolated, such that there is no disruption of power to any of the loads.

SUMMARY

The disclosed power network applies to systems that transmit differential data over the same two wires that deliver DC voltage to loads (e.g., Power over Ethernet systems) and to systems that only supply DC voltage to loads.

In one embodiment, one or more rings of nodes are connected together to form a network of nodes. Each node includes a load, switches, a signature component, detection circuitry (for detecting a signature component of an adjacent node), and a controller. Each node has two ports, where the opposing ports of adjacent nodes are connected together by a pair of wires. At one termination point, a first PSE is connected to a port of an adjacent node. At the opposite termination point, a second PSE is connected to a port of its adjacent node. There may be two or more nodes adjacent to each PSE.

Power applied to one port of a node may be selectively fed through to the other port of the node to power an adjacent node, assuming no fault is detected between the nodes. Any port may act as an input port for power or an output port for power to supply power to the adjacent node. The nodes successively detect a proper connection to their adjacent nodes and apply power to their adjacent nodes, so that power is successively supplied to all the nodes. The nodes operate independently to apply power to their adjacent nodes.

In another embodiment, the nodes apply power to their adjacent nodes via a central controller.

Each port of a node selectively presents a detection signature on the wires connected to that port or detects a signature from the wires connected to that port, depending on whether the node is acting as a power receiver at that port, a power transmitter at that port, or neither. By the various nodes detecting signatures from adjacent nodes and presenting signatures to adjacent nodes, the location of a fault between adjacent nodes can be identified by a node failing to receive a proper signature from its adjacent node. The signature may be a particular resistance value or other component value switched across the wires, and the detector in each node detects whether the proper component value is present across the wires.

When a fault is identified at one port of a powered first node (i.e., the proper signature from an adjacent, unpowered second node is not detected, or current flow is indicative of a fault), the operation of the switches in the first node prevents DC power being coupled to that port, and the second node is then automatically powered from its other adjacent node connected to the opposite port of the second node. Thus, all nodes receive power from either of their adjacent nodes, enabling power to be routed around the fault and the fault to be isolated.

"Smart" circuitry in each node, powered by the voltage applied to either port by its adjacent node, controls internal switches to either present the signature on the wires or detect an adjacent node's signature on the wires. If no fault is detected, a connection switch connects the wires at one port of a powered node to the wires at the node's other port in order to power the adjacent node. Thus, the nodes are powered up in sequence by a DC voltage applied to either of the two ports.

In one embodiment, differential Ethernet data is also transmitted on the wire pair along with the DC voltage, and the nodes and PSEs process the data to communicate any information between the nodes and the PSEs. The data can be used to identify to a technician the location of a fault. The DC voltage is easily filtered out from the AC data path, such as by a transformer or capacitors, and does not affect the differential data. Additionally, the data signals can be filtered out from the power path using inductors, which only pass the DC voltage and low frequency signals.

The invention is particularly useful for automobile and industrial applications where reduction in wiring and high reliability is a significant concern.

BRIEF DESCRIPTION OF THE DRAWINGS

Elements that are the same or equivalent are labeled with the same numeral.

DETAILED DESCRIPTION

Figure 1:
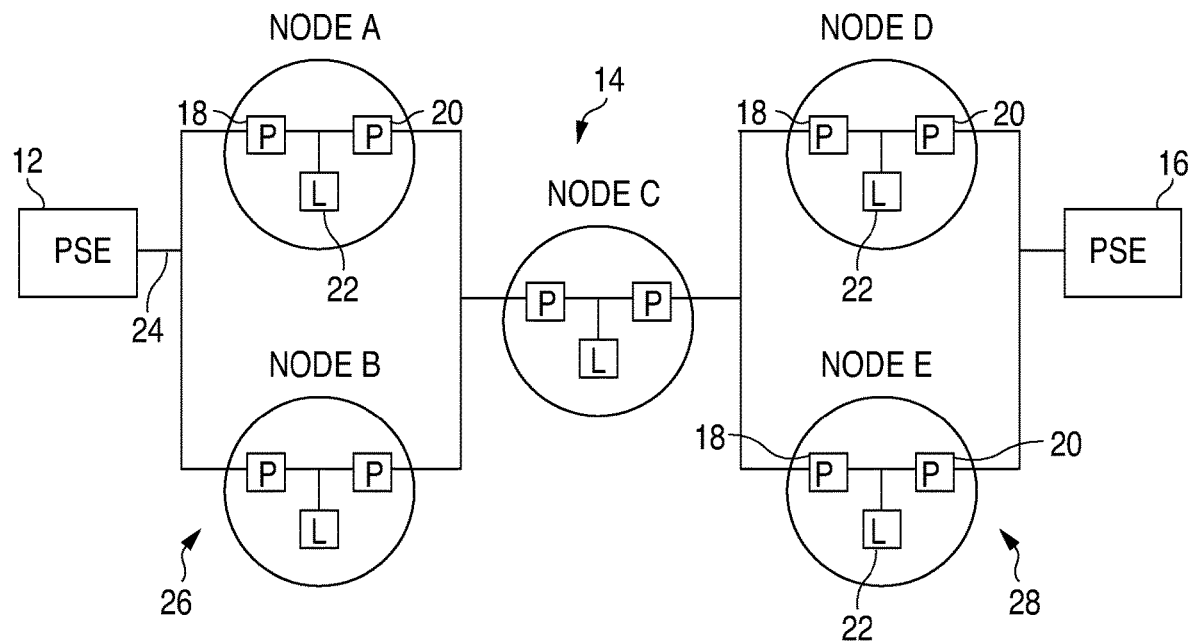
FIG. 1 illustrates one type of power network configuration where interconnected nodes within a plurality of rings receive power from a PSE via one of their two adjacent nodes.

FIG. 1 illustrates one of many possible embodiments of a power network, where one or more PSEs are connected to termination points of a network of interconnected nodes, where each node includes two ports and a load. The network is configured such that, if there is a fault anywhere in the network, the fault is automatically isolated by switches in the nodes, and power to all nodes is automatically routed around the fault. The location of the fault may then be identified by a differential data signal on the DC power wires and fixed by a technician.

The nodes may be connected in any pattern, such as in one or more rings, serially, a mesh, a combination of rings connected in series, or other suitable combinations where power can enter each node via one of its two ports.

Figure 5:
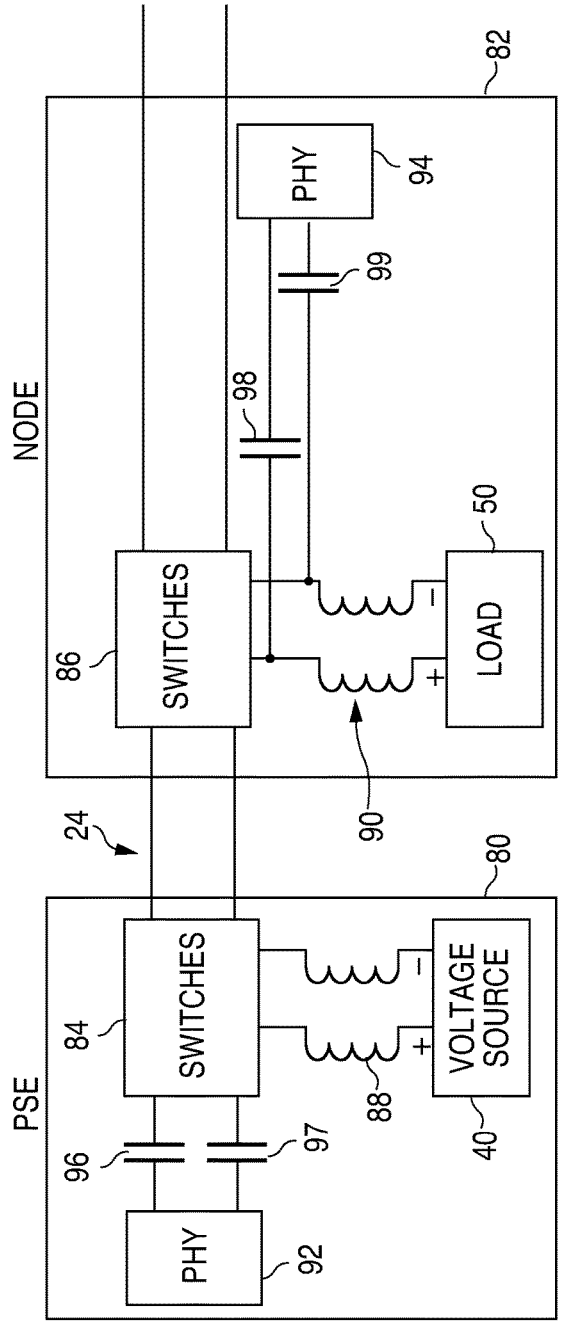
FIG. 5 illustrates DC and AC coupling/decoupling circuitry for an embodiment where the wire pair carrying DC voltage also carries differential data for communications between the various components in the network.

A first PSE 12 is connected to one termination point of the network of nodes 14, and a second PSE 16 is connected to the opposite termination point. Each node, such as node A, includes a first port 18, a second port 20, and a load 22 to be powered. The load 22 can be any type of device and can include digital communication circuitry for transmitting differential data over a twisted wire pair 24 connecting the nodes to the PSEs 12 and 16 and interconnecting the nodes. Other types of wiring can be used, such as shielded cable. The DC voltage and the AC data can be coupled/decoupled to/from the wire pair 24 using DC-coupling inductors and AC-coupling capacitors. This is shown in FIG. 5, described later.

In the example of FIG. 1, any number of nodes is connected in a first ring 26 of nodes, and any number of nodes is connected in a second ring 28 of nodes. The two rings 26 and 28 are connected by one or more nodes (node C) in series. There may be more rings of nodes and more series nodes. Any other suitable configuration is possible where any node can receive power from either port in the event of a single fault between any of the nodes.

Figure 2:
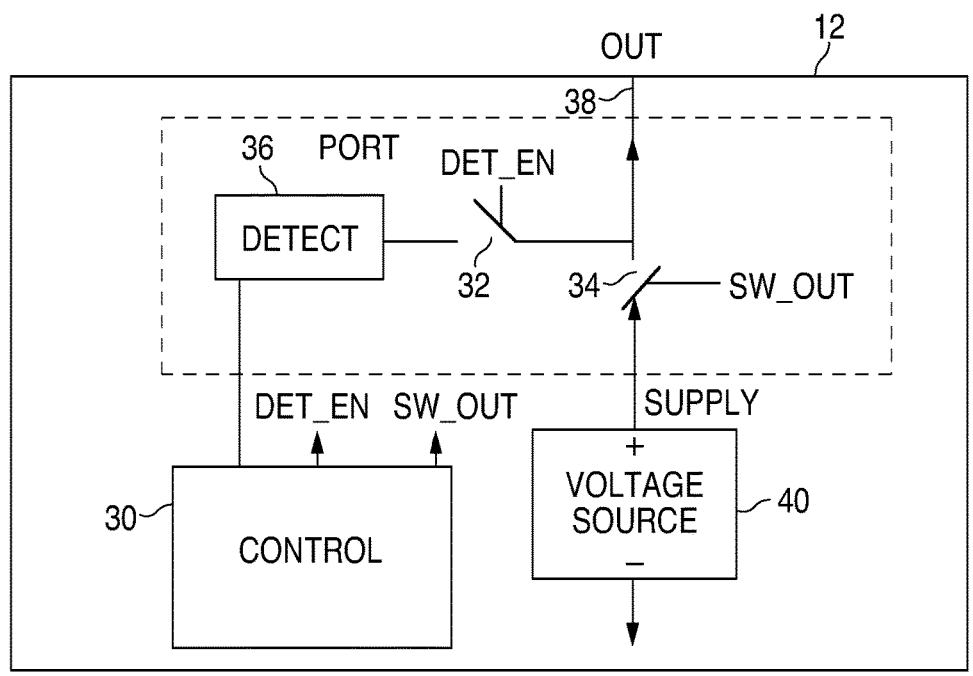
FIG. 2 illustrates pertinent circuit within each PSE.

FIG. 2 illustrates pertinent functional units in PSE 12. PSE 16 may be identical. A controller 30 controls the operation of a detection switch 32 and a power switch 34. The controller 30 may be a state machine, a processor, firmware, or other logic circuit.

Upon the system powering up, the controller 30 closes the detection switch 32 via a DET_EN signal and causes a detection circuit 36 to initiate a low power, low frequency detection routine. One output terminal 38 is connected to the positive voltage wire in the wire pair 24 (FIG. 1) and the other wire in the wire pair 24 may be grounded. Alternatively, as described with respect to FIG. 5, neither wire is grounded, and the DC voltage source 40 has its terminals connected to the wire pair 24 via DC-coupling inductors.

The wire pair 24 may be a balanced twisted pair for also carrying differential data. In another embodiment, the wires may be a shielded cable with a core and an outer shield. The shield may be connected to ground, while the core carries data as well as a DC voltage.

As will be later described in more detail, each port of the nodes is controllable to present a detection signature across the wires in the wire pair 24. Such a detection signature may be a particular value resistor, such as 25 kohms, or other component or circuit having a known characteristic. Such other components may be a capacitor, a Zener diode, etc. The detection circuit 36 presents a low current/low voltage signal across the wires and detects the presence of the detection signature at the adjacent node. If a signature resistance is used, the detection circuit 36 may provide a low current through the wires and detect the resulting voltage. A fault will typically be either an open circuit or a short, so it is fairly easy to determine whether the wire pair 24 presents a short or an open circuit. If the detection signature is within a suitable range of the expected detection signature, the controller 30 opens the switch 32 and closes the power switch 34 to connect the full DC voltage across the wires in the wire pair 24.

The PSE 12 may also include current detection circuitry that detects whether there is a current overload by the nodes and then opens the power switch 34. Such a current overload may be due to a faulty load in any of the nodes.

Figure 3:
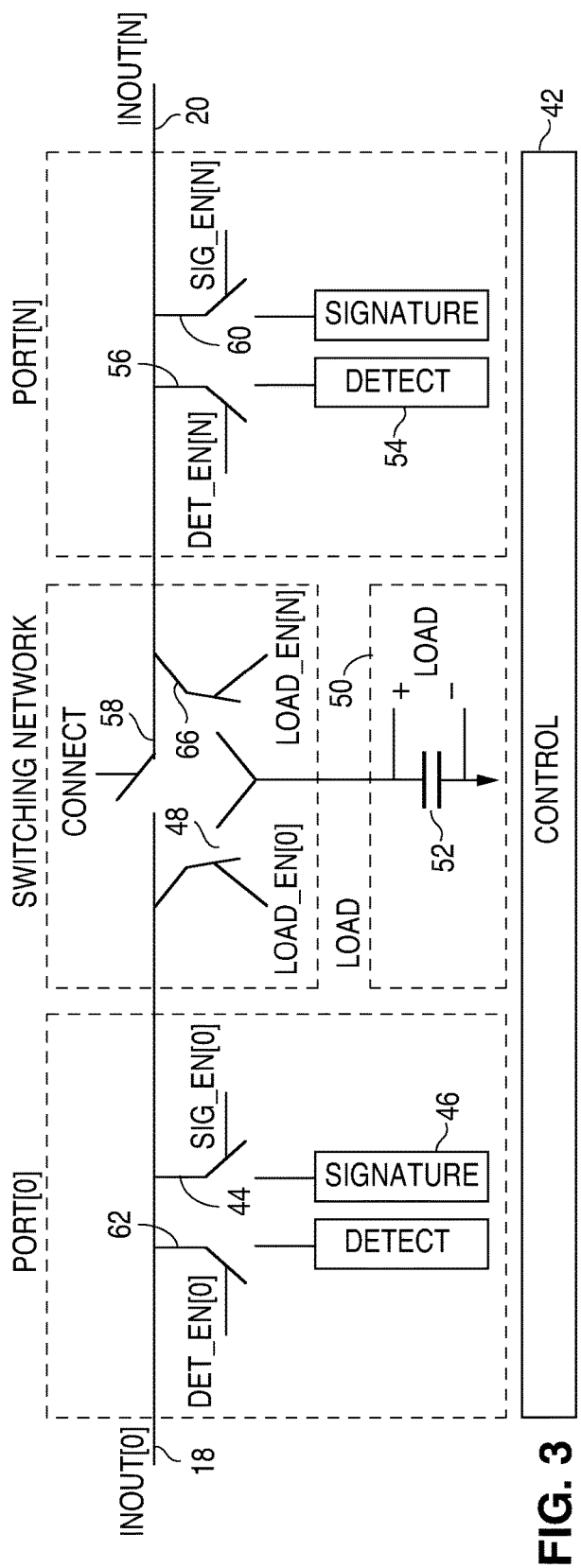
FIG. 3 illustrates pertinent circuitry within each node, where adjacent nodes are connected together port-to-port.

Once the nodes (e.g., nodes A and B in FIG. 1) adjacent to the PSE 12 are powered up by the PSE 12, they may now independently operate to pass the DC voltage to their downstream adjacent nodes, described with respect to FIG. 3.

FIG. 3 illustrates the pertinent functional units in each node. When the PSE 12 supplies the low current by the detection circuit 36 to node A, for example, this powers the controller 42 in the node A. The controller 42 then temporarily closes the switch 44 to connect the signature component 46 across the wires of the port 18 receiving the detection current. Upon a successful detection, the PSE 12 couples the DC voltage source 40 (FIG. 2) across the wires, as described above, and the controller 42 in the node opens the switch 44. This full voltage may be converted to any other operating voltage in the node by a voltage converter as part of the node load. Once the node determines that that the voltage is above a minimum threshold, such as by using a comparator, the controller 42 closes the power switch 48 to connect the voltage across the node's load 50.

A capacitor 52 across the load's power terminals ensures that the load 50 will continued to be powered if there is a brief interruption in power from the PSE 12, such as during a fault re-routing routine. Also, the network may intermittently perform a brief detection routine after being fully powered to determine the health of the network, and the capacitor 52 may power the load 50 during these brief intervals.

The controller 42 may be a state machine, a processor, firmware, or any other logic circuit.

Once the node A, adjacent the PSE 12, is fully powered, the node then performs a routine prior to connecting the incoming DC voltage to its adjacent (downstream) node via the opposite port 20. The controller 42 closes the detection circuit 54 switch 56, which supplies a low current/voltage to the wires connected to the port 20, exactly as was done by the PSE 12. The detection circuit 54 may comprise a current source and a voltage detector for measuring a voltage across the wires. The adjacent node connected to the port 20 then closes its "signature component" switch 44 to place its signature component across the wires. The node A then detects the proper signature component in the adjacent node coupled to the port 20 and thus knows that there is no fault coupled to the port 20. The node A then opens the detection circuit switch 56 and closes the connection switch 58, which forwards the full DC voltage to the downstream adjacent node.

This operation continues for all the nodes in sequence until all the nodes are powered. The sequence proceeds from left to right from the PSE 12 and proceeds right to left from the PSE 16. Once a node is powered from one of its ports, it cannot also receive power from its other port. Thus, the connection switch 58 will be open for one or more nodes, and each node will be powered by either the PSE 12 or 16, assuming there is no fault. More specifically, once a node receives the DC power from one port (either from one of the PSEs or an adjacent node), the controller 42 in the node prevents the opposite port from also receiving power. In this way, one PSE cannot be a load for the other PSE.

In some cases, two or more nodes may be connected in parallel to the PSE 12, such as nodes A and B, and these two nodes will operate independently and simultaneously to present their signatures to the PSE 12 and ultimately receive the full DC voltage from the PSE 12.

The operations of the nodes to close and open the switches 44, 56, 60, 62 associated with the particular ports, as described above, cause the various nodes to receive power from one port and transmit power from the opposite port until all the nodes are powered. Thus, although the operation of FIG. 3 was described where the power was input into the node via the port 18, the power may have entered via the port 20. In such a case, the controller 42 would have closed the switch 60 to present the signature to the right-adjacent node (to then receive power from the right-adjacent node via port 20) and, once powered up, would have closed the switch 62 to detect the signature from the left-adjacent node in order to power up the left-adjacent node via the port 18.

Accordingly, all the nodes are powered up in sequence away from each of the PSEs.

In one example of a fault, if the proper signature response is not detected by node A at its port 20 from the port 18 of node C, for example, node A does not supply power to the port 18 of node C (i.e., the connection switch 58 in node A is not closed). Therefore, a fault in the wiring likely exists between the two nodes. In such an event, the remaining nodes will automatically be successively powered until power to the port 20 of node C is supplied by node D or E. The node C will then connect the DC power to its load 50 by closing the power switch 66. Thus, the fault between the nodes A and C will be isolated by the open connection switch 58 of the nodes A and C. After the node C is powered up, it will try to perform a signature detection at its port 18. Assuming there is a short circuit between nodes A and C (the signature detection failed), the node C will not close its connection switch 58, resulting in the PSE 12 only powering nodes A and B, and the PSE 16 powering the remaining nodes C-E.

If the load 50 is found to be faulty by the controller 72, the load power switches 48 and 66 may be opened by the controller 42 while the connection switch 58 is closed to couple the ports 18 and 20 together.

In some network configurations, such as a single ring of nodes, only one PSE is needed since any fault in the ring would just cause power to travel clockwise around the ring, counter-clockwise, or both until all the nodes are powered.

In FIG. 3, there is a single connection switch 58 per node and two load power switches 48 and 66 per node.

Figure 4:
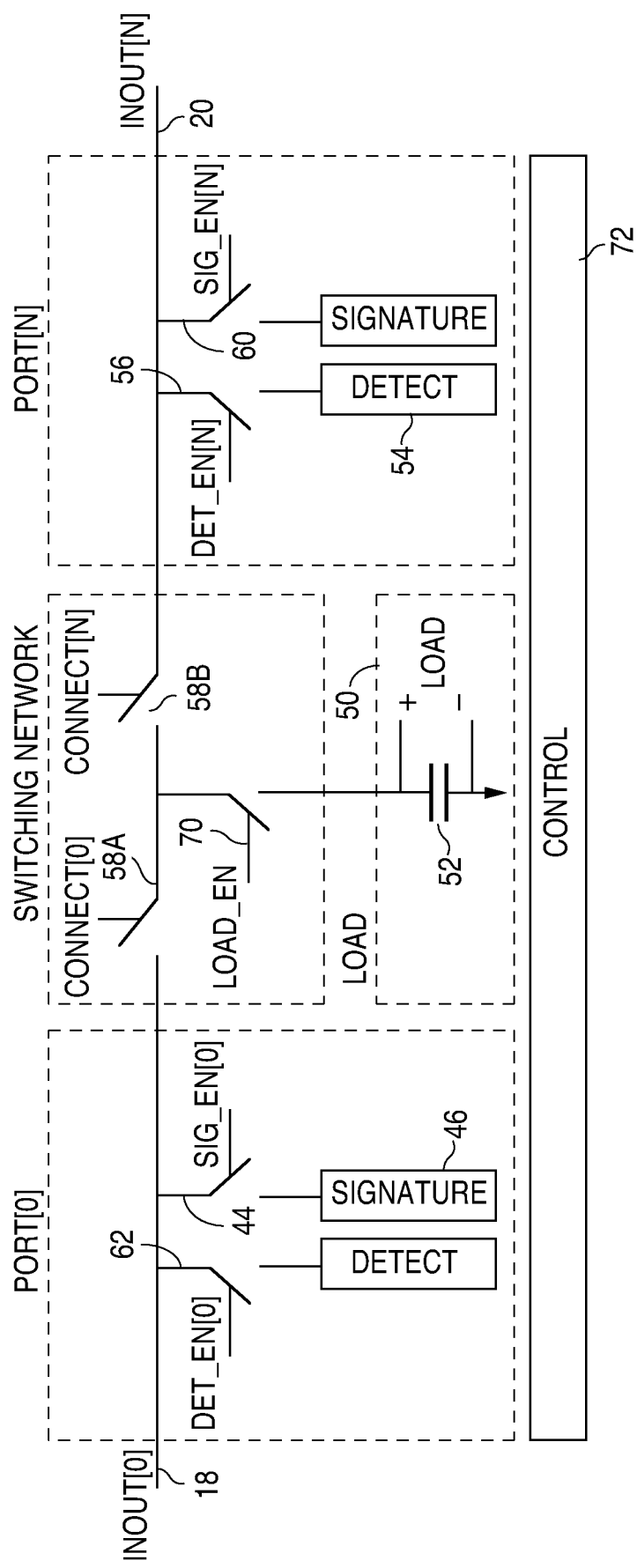
FIG. 4 illustrates pertinent circuitry within each node, in another embodiment, where adjacent nodes are connected together port-to-port.

In the alternative configuration of FIG. 4, there are two connection switches 58A and 58B per node and one load power switch 70 per load. In FIG. 4, the detection and signature portions are the same as in FIG. 3, but the controller 72 closes both connection switches 58A and 58B to connect the DC power between the two ports 18 and 20. There is only one load power switch 70. Thus, the load 50 may be powered by closing the switch 70 along with one or both of the connection switches 58A and 58B.

FIG. 5 illustrates how the PSE 80 and nodes 82 in any of the embodiments may communicate via Ethernet differential data over the twisted wire pair 24 while also conducting a DC voltage over the same wire pair 24. The switches 84 in the PSE 80 comprise the various switches and circuitry shown in FIG. 2 for detection, power coupling, signature, etc., and the switches 86 in the node 82 comprise the various switches and circuitry shown in FIG. 3 or 4 for detection, power coupling, signature, etc. The DC voltage source 40 is coupled to the wires via the DC coupling inductors 88, and the DC voltage is de-coupled at the node 82 by the inductors 90. The AC data signals are coupled between the PHYs 92 and 94 via the AC coupling capacitors 96-99. The PHYs 92 and 94 contain the various transceivers and other circuitry for the digital communications. Any type of data processing circuitry may be coupled to the PHYs 92 and 94. In this way, the location of a fault may be communicated to a technician for fixing. Any other information may be conveyed along the wire pair 24.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A powered network comprising:
   at least one power sourcing equipment (PSE) configured for supplying DC power to a plurality of interconnected nodes, the interconnected nodes including first nodes, each of the first nodes being connected to a first adjacent node and a second adjacent node;
   the first nodes comprising:
   a first port having a first terminal and a second terminal connected to the first adjacent node;
   a second port having a third terminal and a fourth terminal connected to the second adjacent node;
   a first signature circuit selectively coupled to the first port and configured to present a particular electrical signature in response to a detection signal applied to the first port from the first adjacent node coupled to the first port;
   a second signature circuit selectively coupled to the second port and configured to present the particular electrical signature in response to the detection signal applied to the second port from the second adjacent node coupled to the second port;
   a first detection circuit selectively coupled to the first port and configured to present the detection signal to the second port of the first adjacent node and detect the particular electrical signature of the first adjacent node;
   a second detection circuit selectively coupled to the second port and configured to present the detection signal to the first port of the second adjacent node and detect the particular electrical signature of the second adjacent node; and
   one or more connection switches coupled to connect the first port to the second port if the first detection circuit or the second detection circuit detects the particular electrical signature of the first adjacent node or the second adjacent node,
   wherein the first nodes selectively pass a DC voltage from the PSE to the first adjacent node or the second adjacent node after detecting the particular electrical signature from the first adjacent node or the second adjacent node, depending on whether the DC voltage is received at the first port or the second port of the first nodes, such that the interconnected nodes are powered up in a sequence, and
   wherein the interconnected nodes operate independently to detect a fault between the interconnected nodes, such that the PSE is not used to detect a fault between the interconnected nodes.

2. The network of claim 1 wherein the PSE comprises:
   a DC voltage source;
   a first power switch selectively coupling the DC voltage source to the first port of one of the nodes directly coupled to the PSE; and a third detection circuit selectively coupled to the first port of the one of the nodes directly coupled to the PSE, the third detection circuit configured to present the detection signal to the first port of the one of the nodes directly coupled to the PSE and detect the particular electrical signature of the one of the nodes directly coupled to the PSE, wherein the PSE is configured to close the first power switch to couple the DC voltage source to the first port of the one of the nodes directly coupled to the PSE if the particular electrical signature is detected.

3. The network of claim 1 wherein the first nodes comprise a controller powered by the DC power supplied by the PSE, the controller controlling coupling switches for selectively coupling the first signature circuit, the second signature circuit, the first detection circuit, and the second detection circuit to their associated first port or second port depending on whether the DC power is received at the first port or the second port.

4. The network of claim 1 wherein the first nodes further comprise;
   a load; and
   a power switch connected to couple the load to the DC voltage from the PSE applied to either the first port or the second port.

5. The network of claim 1 wherein a fault in wiring between the first nodes and the first adjacent node prevents the first adjacent node from presenting the particular electrical signature of the first adjacent node to the first detection circuit, thus preventing the first nodes from supplying the DC power to the first adjacent node, and
   wherein a fault in wiring between the first nodes and the second adjacent node prevents the second adjacent node from presenting the particular electrical signature of the second adjacent node to the second detection circuit, thus preventing the first nodes from supplying the DC power to the second adjacent node.

6. The network of claim 1 wherein the first nodes, the first adjacent node, and the second adjacent node are interconnected via a wire pair connected between opposing ones of the first port and the second port of the first nodes, the first adjacent node, and the second adjacent node.

7. The network of claim 1 wherein the one or more connection switches is a single connection switch between the first port and the second port.

8. The network of claim 1 wherein the one or more connection switches comprise two connection switches in series between the first port and the second port.

9. The network of claim 1 wherein at least some of the first nodes are connected in a ring.

10. The network of claim 1 wherein the at least one PSE comprise a plurality of PSEs coupled at different points to the plurality of interconnected nodes.

11. The network of claim 1 wherein the first nodes are sequentially powered up by closing of the one or more connection switches.

12. The network of claim 1 wherein the plurality of interconnected nodes are interconnected by a wire pair for conducting the DC power.

13. The network of claim 12 wherein the wire pair also carries differential data between the PSE and the plurality of interconnected nodes.

14. A method of powering a plurality of interconnected nodes comprising:
   a. supplying DC power to a first port of a first node directly coupled to power sourcing equipment (PSE);
   b. providing a detection signal from a second port of the first node to a first port of a second node;
   c. the second node providing a particular electrical signature in response to the detection signal from the first node;
   d. detecting the particular electrical signature by the first node and coupling the first port of the first node to the second port of the first node to supply the DC power to the first port of the second node; and
   e. repeating steps b-d for additional nodes in the plurality of interconnected nodes to sequentially power up all the nodes in the plurality of interconnected nodes, wherein the interconnected nodes operate independently to detect a fault between the interconnected nodes, such that the PSE is not used to detect a fault between the interconnected nodes, and wherein the nodes receive power from either of two ports, depending on a direction of sequentially powering up the nodes to bypass the fault.

15. The method of claim 14 wherein at least some of the nodes are connected in a ring.

16. The method of claim 14 where there are a plurality of PSEs coupled at different points to the plurality of interconnected nodes.

17. The method of claim 14 wherein the nodes are interconnected by a wire pair, and wherein differential data is also transmitted over the wire pair along with the DC power.

18. The method of claim 14 wherein the particular electrical signature will not be detected by the first node if there is a fault in wiring between the first node and the second node.

19. A network for being powered by at least one power sourcing equipment (PSE) configured for supplying DC power to a plurality of interconnected nodes, the interconnected nodes including first nodes, each of the first nodes being connected to a first adjacent node and a second adjacent node, the network comprising:
   the first nodes comprising:
      a first port having a first terminal and a second terminal connected to the first adjacent node;
      a second port having a third terminal and a fourth terminal connected to the second adjacent node;
      a first signature circuit selectively coupled to the first port and configured to present a particular electrical signature in response to a detection signal applied to the first port from the first adjacent node coupled to the first port;
      a second signature circuit selectively coupled to the second port and configured to present the particular electrical signature in response to the detection signal applied to the second port from the second adjacent node coupled to the second port;
      a first detection circuit selectively coupled to the first port and configured to present the detection signal to the second port of the first adjacent node and detect the particular electrical signature of the first adjacent node;
      a second detection circuit selectively coupled to the second port and configured to present the detection signal to the first port of the second adjacent node and detect the particular electrical signature of the second adjacent node; and
      one or more connection switches coupled to connect the first port to the second port if the first detection circuit or the second detection circuit detects the particular electrical signature of the first adjacent node or the second adjacent node, wherein the first nodes selectively pass a DC voltage from the PSE to the first adjacent node or the second adjacent node after detecting the particular electrical signature from the first adjacent node or the second adjacent node, depending on whether the DC voltage is received at the first port or the second port of the first nodes, such that the interconnected nodes are powered up in a sequence, and wherein the interconnected nodes operate independently to detect a fault between the interconnected nodes, such that the PSE is not used to detect a fault between the interconnected nodes.

* * * * *